Inventors:
Harry Palevsky
Robert K. Swank

Oct. 7, 1952 — H. PALEVSKY ET AL — 2,613,236

VOLTAGE MEASURING APPARATUS

Filed Aug. 9, 1946 — 2 SHEETS—SHEET 2

Inventors:
Harry Palevsky
Robert K. Swank
By Robert A. Laraba
Attorney.

Patented Oct. 7, 1952

2,613,236

UNITED STATES PATENT OFFICE 2,613,236

VOLTAGE MEASURING APPARATUS

Harry Palevsky, Chicago, and Robert K. Swank, Urbana, Ill., assignors to the United States of America as represented by the United States Atomic Energy Commission Application August 9, 1946, Serial No. 689,480

4 Claims. (Cl. 171—95)

Our invention relates to an improved ultrasensitive electrometer system for the measurement of small direct voltages from sources of very high impedance and for the measurement of electrostatic charge. The system is particularly useful for measuring the charge collected over a period of time by an ionization chamber as the result of ionization produced by radioactivity, or for measuring the voltage appearing across a resistance of the order of many billions of ohms as a result of current through the ionization chamber induced by such ionization.

In making a continuous measurement of the charge collected by an ionization chamber over a period of time, it is necessary that the measuring instrument present no path by which the charges of opposite polarity can leak off and thus become neutralized. For this reason, direct-current amplifiers cannot be used, since any vacuum tube now known passes sufficient current between grid and cathode to provide a low enough resistive path to make such measurement impracticable, particularly when coupled with the instabilities of direct-current amplifiers. The same objections to direct-current amplifiers arise in measuring small voltages and currents from sources of extremely high internal resistance. In either case, the measurement requires an electrostatic instrument, an instrument which presents a virtually infinite resistance to direct voltages.

The devices most commonly used heretofore are instruments of the nature of the electroscope and the quadrant electrometer, wherein the charge is collected on two or more electrodes, at least one of which has some degree of freedom of motion relative to the others, the force caused by the repulsion or attraction of the like or unlike charges thus producing a relative motion which is magnified and measured by means of an optical system. Because of their delicacy and relative instability, these instruments require a skilled technician to install and operate them.

Since the advantage of alternating current amplifiers over direct current amplifiers in respect to stability is well-known, there have been devised various means of converting direct voltages to alternating voltages for purposes of measurement. By far the most satisfactory of these from the aspect of high input resistance to the direct voltage or charge under measurement is the dynamic condenser. In this device a charge proportional to the direct voltage under measurement is placed on a condenser wherein one of the plates is movable with respect to the other. The movable plate is then caused to oscillate with respect to the fixed plate at an audio frequency by mechanical or magnetic means. The system is so designed that the charge on the condenser cannot accumulate and leak off quickly enough to follow the variations in capacity thus induced; thus the voltage across the condenser varies in a periodic manner and the alternating voltage signal thus induced is amplified in an alternating current amplifier.

In the systems embodying a dynamic condenser heretofore used, one of two objections appears. On the one hand, where the output of the alternating-current amplifier is used as a direct measure of the voltage or charge on the condenser plates, changes in gain of the amplifier are fully reflected in the reading. On the other hand, those systems embodying "null" devices to balance out the direct voltage under measurement require relatively elaborate and heavy components, such as motors and indicating potentiometers.

In amplifying and measuring the alternating voltage signal, it is necessary, for sensitive applications, to discriminate against amplifier background, such as stray electromagnetic fields, tube noise and microphonic effects. Synchronous motors have been designed for this purpose, and are commonly used in the null devices mentioned above. Another method of accomplishing this discrimination is the use of an amplifier with resonant circuits. This system is subject to the objection that any change in the frequency at which the dynamic condenser is driven occasions a large change in the gain of the amplifier. In addition, resonant circuits for the frequencies at which dynamic condensers are suited to be driven are bulky. A third method which has been employed is the use of an untuned amplifier with a synchronous detector, sometimes called a lock-in detector. In the latter apparatus, the voltage source which drives the dynamic condenser is employed to control the detector, which converts the alternating voltage output of the amplifier back to direct voltage for measurement in such a manner that amplifier output signals of frequencies other than that of the driving voltage source have no effect. Such systems have the advantage of being independent of changes in the frequency of the driving voltage. However, the synchronous detectors heretofore employed require a plurality of vacuum tube elements and transformers.

The principal object of our invention is to provide a simple, yet sensitive, reliable, and stable, amplification and metering system for use with dynamic condensers.

A further object of our invention is to provide a simple and reliable synchronous detector circuit.

A further object of our invention is to provide a stable oscillator circuit suitable for driving a magnetically operated device such as a dynamic condenser.

A further object of our invention is to provide an improved circuit for coupling a dynamic condenser to the input of an alternating current amplifier.

Other aims and objects of our invention will appear from the description of our invention which appears below and which is illustrated by the drawings in which.

Figure 1:
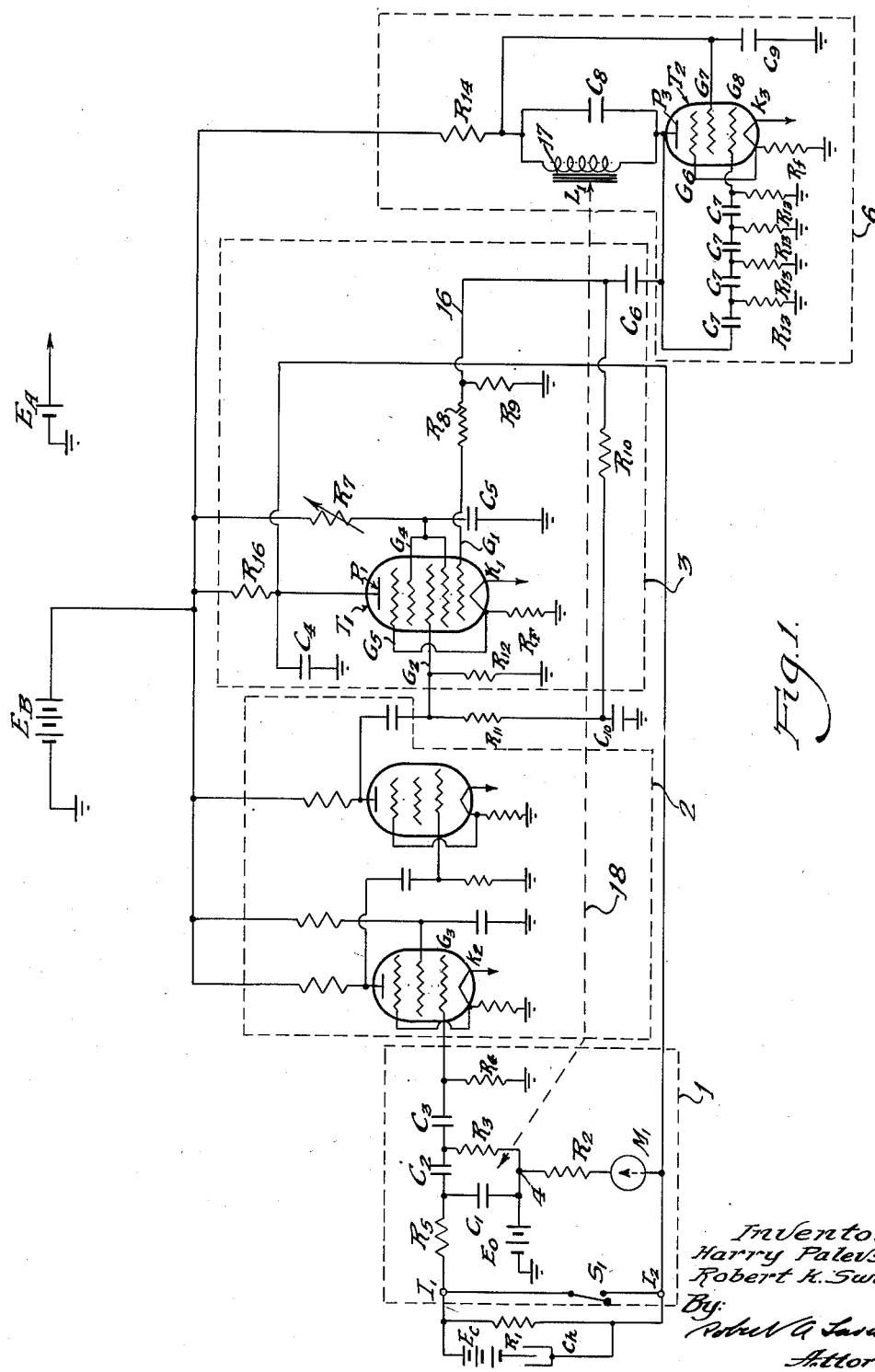
Figure 1 is a schematic circuit diagram of a dynamic condenser electrometer system embodying our invention.

Referring first to Figure 1, it will be advantageous to analyze first the operation of the various component circuits, subsequently describing the overall operation. As illustrated in Figure 1, the apparatus is applied to the measurement of ionization chamber current. It is well-known that when an ionization chamber $Ch$ is connected in series with a resistor $R_1$ and a proper voltage source $E_c$, the current in the circuit, and thus the voltage across the resistor $R_1$, is proportional to the ionizing radioactivity to which the chamber $Ch$ is exposed. The current is solely a function of the ionization in the chamber; thus for a given ionization the voltage across the resistor $R_1$ is proportional to the resistance of $R_1$. To develop voltages sufficient for measurement from extremely small values of ionization current, it is therefore necessary to employ very large values of resistance for resistor $R_1$, of the order of $10^{11}$ to $10^{12}$ ohms.

Figure 4:
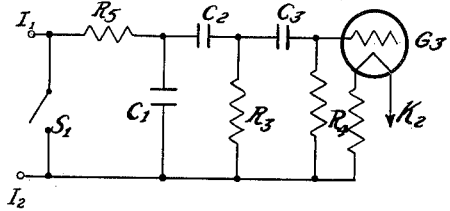
Figure 4 is a simplified schematic circuit diagram of our dynamic condenser circuit.

The voltage across resistor $R_1$ is impressed on input terminals $I_1$ $I_2$ of the dynamic condenser circuit enclosed by dotted line 1. In explaining the operation of the latter circuit, the resistor $R_2$, the meter $M_1$ and the battery $E_0$ may be neglected for present purposes, their function being described later. Accordingly, Figure 4 illustrates the dynamic condenser circuit enclosed by dotted line 1 of Figure 1, with the above elements omitted. As used herein, the term "dynamic condenser circuit" refers to the dynamic condenser with its associated input and output coupling networks.

Before describing the dynamic condenser circuit of Figure 4, which constitutes one portion of our invention, reference is first made to a dynamic condenser circuit heretofore in use. The difference between this circuit and the circuit illustrated in Figure 4 is that in the former, condenser $C_3$ and resistor $R_3$ do not appear, condenser $C_2$ being connected directly to grid $G_3$. It will readily be seen that condenser $C_2$ and resistor $R_4$ constitute a resistance-capacity coupling. The voltage under measurement is placed across input terminals $I_1$ and $I_2$. Current then flows through resistors $R_4$ and $R_5$ until condensers $C_1$ and $C_2$ are charged to the potential which appears at terminals $I_1$ and $I_2$. When the capacity of dynamic condenser $C_1$ is periodically varied, the total charge on the condensers $C_1$ and $C_2$ remains constant, as resistor $R_5$ is so large as to allow negligible leakage of the charge back to terminals $I_1$ and $I_2$ during the cycle of operation of dynamic condenser $C_1$. However, as the capacitance of dynamic condenser $C_1$ is varied, the charge will be redistributed between the dynamic condenser $C_1$ and condenser $C_2$, which is preferably an air dielectric condenser. This periodic redistribution of charge appears as a periodic flow of current through resistor $R_4$, thus creating an alternating voltage between control grid $G_3$ and cathode $K_2$ of the input tube of an alternating current amplifier.

It is well-known in the art that in any vacuum tube there is a flow of current between grid and cathode which produces a potential across a resistor placed between the grid and the cathode. Let us now consider the effect of this grid current on the circuit of Figure 4 with condenser $C_2$ and resistor $R_3$ deleted, as stated above, assuming no voltage source connected across terminals $I_1$ and $I_2$. If switch $S_1$ is closed, dynamic condenser $C_1$ discharges entirely, and the full voltage appearing across resistor $R_4$ as a result of grid current appears across condenser $C_2$. This condition will remain if switch $S_1$ is opened, as long as the grid current through resistor $R_4$ remains constant. Under these conditions there is no alternating voltage produced. However, with switch $S_1$ open, any change in the grid current through resistor $R_4$ will place a charge upon dynamic condenser $C_1$ and thus create an alternating current signal which endures as long as the grid current retains its new value. Since grid current in a vacuum tube is not constant, instability of the system results, because the changes in grid current result in a spurious signal which has the same effects as placing a voltage source across the input terminals.

In our invention, as shown in Figure 4, we have avoided the instability arising from grid current. We have added to the circuit heretofore used the condenser $C_3$ and the resistor $R_3$, thus cascading two resistance-capacity couplings. It may be seen that with these elements, grid current will charge only condenser $C_3$, not dynamic condenser $C_1$ or condenser $C_2$. Thus in the absence of a voltage source across terminals $I_1$ and $I_2$, no signal appears, and a slow change in grid current will not produce a drift in the "zero" of the instrument, as occurred before our invention.

Referring now again to dynamic condenser circuit 1 of Figure 1, one terminal of the series combination of resistor $R_2$ and meter $M_1$ is at a fixed potential above ground potential, the balancing battery $E_0$ being placed between this point 4 and ground. One terminal of dynamic condenser $C_1$ and of resistor $R_3$ are likewise connected to this point 4. The other terminal of the series combination of resistor $R_2$ and meter $M_1$ is connected to the plate $P_1$ of vacuum tube $T_1$ of synchronous detector 3, delineated by dotted lines. As will be shown subsequently, said plate $P_1$ is, in the absence of voltage across terminals $I_1$, $I_2$, at the same potential as point 4. Thus, in the absence of voltage across terminals $I_1$ $I_2$, there is no voltage across, or current flow through, the series combination of resistor $R_2$ and meter $M_1$. However, a voltage across terminals $I_1$ $I_2$ produces an alternating voltage in the dynamic condenser circuit, which voltage is amplified in amplifier 2 and, in the manner described subsequently, induces direct current flow in resistor $R_2$, and consequent voltage in such polarity as to oppose the voltage impressed across the terminals $I_1 I_2$ and thus reduce the charge on the dynamic condenser. The current through meter $M_1$, and thus the voltage across resistor $R_2$, is proportional to the voltage appearing at the input terminals $I_1 I_2$, and is thus a measure of that voltage. In systems in previous use, the voltage appearing across resistor $R_2$ was made equal to the impressed voltage, thus making the system a "null" system. Such previous systems required the use of mechanical devices, such as synchronous motors. The resistance of resistor $R_2$ is preferably small compared with the other resistors in the circuit so that the operation of the circuit of Figure 4, as described above, is not affected by it, except as stated above.

A negative feed-back system, one form of which is described above, is greatly advantageous in reducing the dependence of the measurement on the gain of the amplifier and on the efficiency of the dynamic condenser. This advantage is maximized in the "null" system wherein the voltage fed back completely cancels the input voltage. In our invention, we attain much of the advantage of the null system without the necessity of mechanical components in the feedback system.

Amplifier 2 is a resistance-coupled audio amplifier of a design well-known in the art and will not be described further. It serves to amplify the alternating voltage signal of the dynamic condenser circuit 1 and to impress such amplified signal, whose amplitude is proportional to the direct voltage appearing at input terminals $I_1 I_2$, on one of the control grids $G_2$ of the synchronous detector circuit 3.

Figure 2:
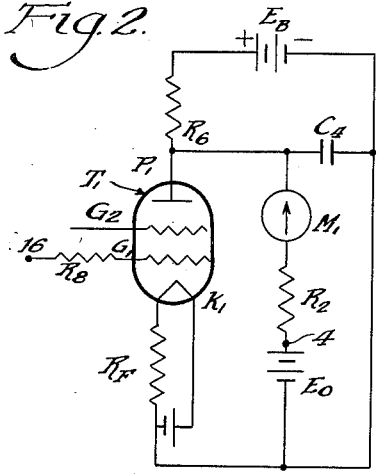
Figure 2 is a simplified schematic diagram of the synchronous detector circuit which constitutes one portion of our invention.

Vacuum tube $T_1$ of the synchronous detector circuit is a tube of the type generally known as a pentagrid converter. Although we have found this type of tube most satisfactory for use in the synchronous detector which constitutes an element of our invention, it should be understood that the principle of our invention does not of necessity require the use of this particular type of vacuum tube. In Figure 2 we have illustrated the basic circuit of the synchronous detector which we have invented, together with the network consisting of condenser $C_4$, meter $M_1$, resistor $R_2$ and battery $E_0$. In this portion of the drawing we have eliminated in the representation of tube $T_1$ all grids but control grids $G_1$ and $G_2$.

The operation of the synchronous detector circuit of Figure 2 may first be considered without regard to the network consisting of condenser $C_4$, meter $M_1$, resistor $R_2$, and battery $E_0$. Tube $T_1$ is a vacuum tube possessing at least two control grids $G_1$ and $G_2$. The plate $P_1$ is connected to the plate supply voltage $E_b$ through load resistor $R_6$. Filament resistor $R_f$ supplies grid bias. Resistor $R_8$ is connected in series with grid $G_1$, thus preventing the potential of this grid from becoming more than slightly positive with respect to cathode $K_1$.

Figure 3:
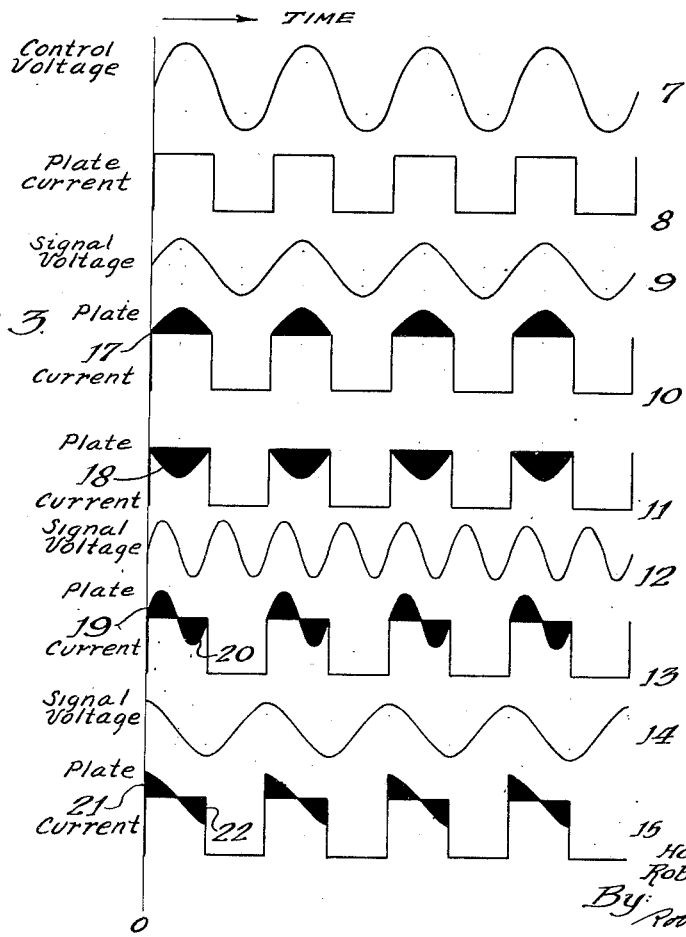
Figure 3 is a diagrammatic representation of certain voltages and currents in said synchronous detector as a function of time under various conditions.

Suppose that there is no signal on grid $G_2$ of tube $T_1$, and that there appears at point 16 a sinusoidal controlling signal 7 of Figure 3 so large that it is capable of driving grid $G_1$ from cathode potential to plate current cut-off potential in a very small portion of its cycle. The plate current pattern of tube $T_1$ will approximate the square wave pattern 8 of Figure 3, wherein all voltage and current patterns are drawn on the same time axis. Any change of the amplitude of controlling signal 7 will produce a negligible effect on the plate current pattern 8. In all subsequent discussion of the operation of the circuit, it is assumed that there is impressed at point 16 the voltage pattern 7 as above described, so that in the absence of signal on grid $G_2$ the plate current pattern is of form 8, wherein the upper level represents the plate current drawn when the grid $G_1$ is at cathode potential and the lower level represents plate-current cut-off. Now suppose there is impressed on grid $G_2$ a sinusoidal signal 9 of the same frequency and phase as controlling signal 7. The plate current will then assume the pattern 10, the average value of the plate current being increased because of the added lobes 17 shown shaded in the diagram. If the signal on grid $G_2$ is 180 electrical degrees out of phase with controlling signal 7, the plate current will assume the pattern 11, the average value being decreased relative to that of pattern 8 because of the subtracted lobes 18 shown shaded in the diagram. If a signal 12 of the frequency of the second harmonic of the controlling signal 7 is impressed on grid $G_2$, the plate current assumes a pattern 13, the average value being unaffected because the effects of lobes 19 and 20, shown shaded in the diagram, cancel each other during the conducting part of the square-wave cycle. Likewise if a signal 14 of the same frequency as the controlling signal 7 but 90 electrical degrees out of phase is impressed on grid $G_2$, the plate current assumes a pattern 15, the average value being unaffected because the effects of lobes 21 and 22, shown shaded in the diagram, cancel each other during the conducting part of the square-wave cycle. By such analysis, it may be shown further that the only frequencies impressed on grid $G_2$ which produce a change in the average value of the plate current are the fundamental and odd harmonics of the frequency of the controlling voltage 7; signals of the frequency of the controlling voltage 7 produce an increase in average current if in phase, no effect if 90 electrical degrees out of phase, or a decrease in average current if 180 electrical degrees out of phase. Signals of intermediate phase relationship produce intermediate effects on the plate current. By use of this synchronous detector, most noise, microphonics and stray electromagnetic fields are prevented from creating a response in the output of the detector.

Condenser $C_4$ is connected from plate $P_1$ to the negative terminal of the plate supply voltage $E_b$, thus by-passing plate load resistor $R_6$, and causing the potential at plate $P_1$ to vary only at slow rates, in accordance with the average value of the plate current. Meter $M_1$ and resistor $R_2$ are in series, with one terminal connected to plate $P_1$ and the other to the positive terminal of the balancing voltage $E_0$, the negative terminal of which is connected to the negative terminal of the plate supply voltage $E_b$, and thus effectively to cathode $K_1$. In the absence of signal on grid $G_2$, the potential of plate $P_1$ is the same as the potential of point 4, the junction point of $R_2$ and balancing voltage $E_0$. Thus there is no current flow through meter $M_1$ and no voltage across resistor $R_2$. An increase of the average plate current of tube $T_1$ lowers the potential of plate $P_1$, causing direct current flow through meter $M_1$ and resistor $R_2$, this current being proportional to the amplitude of a synchronous voltage signal impressed upon grid $G_2$.

Referring now again to Figure 1, the synchronous detector 3 is seen to be the same as the basic circuit shown in Figure 2 and explained above, with certain additions. Screen grids $G_4$ and suppressor grid $G_5$ are connected as in the usual pentagrid converter connection. Screen grids $G_4$ are by-passed to cathode potential by condenser $C_5$. Variable screen resistor $R_7$ is employed to control the average plate current of tube $T_1$ in the absence of signal on grid $G_2$, thus equalizing the potentials of plate $P_1$ and point 4 in the absence of input voltage signal at input terminals $I_1$ $I_2$. It will be noted that the network consisting of meter $M_1$, resistor $R_2$, and battery $E_0$ in Figure 2 is the feedback network of dynamic condenser circuit 1 of Figure 1 described above.

Resistor $R_9$ and condenser $C_6$ constitute the coupling network whereby the controlling voltage is introduced from the oscillator 6 to the synchronous detector 3. Because of the current which flows between cathode $K_1$ and grid $G_1$ when the latter becomes positive with respect to the former in each cycle of the controlling voltage, point 16, the junction point between coupling condenser $C_6$ and grid resistor $R_9$, becomes and remains negative with respect to the cathode. The voltage dividing network $R_{10}$, $R_{11}$, $R_{12}$ maintains a portion of this negative potential on grid $G_2$, thus providing bias. Condenser $C_{10}$ prevents any of the alternating controlling voltage from being impressed on grid $G_2$.

In oscillator 6, tube $T_2$ is a pentode vacuum tube, with suppressor grid $G_6$ connected to cathode $K_3$ in the usual manner and screen grid $G_7$ at a fixed positive potential with reference to cathode $K_3$. Plate $P_3$ is connected to plate supply voltage $E_b$ through the parallel combination of iron-core coil $L_1$ and condenser $C_8$, which constitute a parallel resonant circuit at the frequency of oscillation. The alternating voltage appearing at plate $P_3$ is transmitted to control grid $G_8$, through the phase-shifting network consisting of condensers $C_7$ and resistors $R_{13}$, which are adapted to shift the phase approximately 180 electrical degrees at the frequency of oscillation. The oscillations thus induced cause the current through coil $L_1$ to oscillate sinusoidally and thus vary sinusoidally the magnetic field of iron core 17, which thus varies the magnetic attraction of iron core 17 for the mobile plate of dynamic condenser $C_1$, which is physically adjacent thereto as indicated by the dotted line 18.

As is well-known in the art, the mobile plate of dynamic condenser $C_1$ must also be in a unidirectional magnetic field, in order to prevent capacity variation at the second harmonic, rather than the fundamental, of the oscillator frequency. In the embodiment of the drawing this field is provided by the direct-current component of the plate current of the oscillator tube $T_2$. By making the parallel circuit $L_1$ $C_8$ resonant at frequencies slightly different from the frequency of oscillation, the phase of the current through coil $L_1$ with respect to the voltage at plate $P_3$ may be varied over a wide range. Resistor $R_{14}$ and condenser $C_9$ are preferably inserted to prevent the oscillator 6 from introducing a signal into the amplifier 2 through the voltage supply $E_b$.

The overall operation of the combination will now be easily seen. The voltage under measurement is placed across the input terminals $I_1$ $I_2$ of the dynamic condenser circuit 1. The output alternating voltage signal of the dynamic condenser circuit 1, proportional to the voltage under measurement, is impressed upon amplifier 2. Oscillator 6 provides the controlling voltage for synchronous detector 3 and also drives the dynamic condenser $C_1$. The phase of the oscillation of dynamic condenser $C_1$ is so adjusted that the signal transmitted by the amplifier 2 to the grid $G_2$ of the synchronous detector is in phase with the controlling voltage transmitted from plate $P_3$ to grid $G_1$; when the impressed input direct voltage is of such polarity that terminal $I_1$ is positive with respect to terminal $I_2$; this is accomplished by making the resonant frequency of coil $L_1$ and condenser $C_8$ slightly different from the frequency of oscillation. Thus the synchronous detector 3 discriminates against signals of undesired frequency and phase due to tube noise and stray electromagnetic fields, and produces across resistor $R_2$ a voltage opposing in polarity that of the source under measurement, thus reducing the voltage across the dynamic condenser $C_1$. The current through the meter $M_1$ is a measure of the voltage appearing across resistor $R_2$, and thus of the voltage under measurement. If desired, $M_1$ may be a recording or controlling device. If the voltage across terminals $I_1$ $I_2$ is of such a polarity that $I_1$ is negative with respect to $I_2$, the signal voltage impressed on the synchronous detector 3 is 180 electrical degrees out of phase with the controlling voltage, the polarity of the current through meter $M_1$ and thus the voltage across resistor $R_2$ is opposite to that described above, again reducing the voltage across the dynamic condenser $C_1$. Thus, any voltage impressed between terminals $I_1$ and $I_2$ produces a proportional current in meter $M_1$, the direction of the current being dependent on the polarity of the impressed voltage. The negative feedback thus accomplished without the use of motors or other mechanical devices greatly reduces the effects of changing amplifier gain on the reading obtained.

It will be understood that the description above of one embodiment of our invention should not be deemed to limit the teachings to the embodiment disclosed. Persons skilled in the art will readily find equivalent applications of our invention.

We claim:

1. Apparatus for measuring direct voltage or charge comprising, in combination, a dynamic condenser adapted to convert an input direct voltage to an input alternating voltage, an oscillator coupled to said dynamic condenser, an alternating current amplifier, an isolating coupling circuit connecting the output of the dynamic condenser to the input of the amplifier including a plurality of cascaded resistance-capacity couplings, a synchronous detector comprising a vacuum tube having at least two control electrodes and an output circuit, means for coupling the oscillator to one of the control electrodes of the synchronous detector, means for coupling the output of the amplifier to the other of said control electrodes, means for connecting the output circuit of the synchronous detector in series opposition with the dynamic condenser, and means for measuring the direct voltage output of the synchronous detector.

2. Apparatus for measuring direct voltage or charge comprising, in combination, a dynamic condenser adapted to convert an input direct voltage to an output alternating voltage, driving source means coupled to said dynamic condenser, an alternating current amplifier, an isolating coupling circuit connecting the output of the dynamic condenser to the input of the amplifier including a plurality of cascaded resistance-capacity couplings, a synchronous detector comprising a vacuum tube having at least two control electrodes and an output circuit, means for coupling the driving source means to one of the control electrodes of the synchronous detector, means for coupling the output of the amplifier to the other of said control electrodes, and means for measuring the direct voltage output of the synchronous detector.

3. Apparatus for measuring direct voltage or charge comprising, in combination, a dynamic condenser adapted to convert an input direct voltage to an output alternating voltage, driving source means coupled to said dynamic condenser, an alternating current amplifier, an isolating coupling circuit connecting the output of the dynamic condenser to the input of the amplifier including a plurality of cascaded resistance-capacity couplings, and means for measuring the voltage output of the amplifier.

4. Apparatus for measuring direct voltage or charge comprising, in combination, a dynamic condenser adapted to convert an input direct voltage to an output alternating voltage, driving source means coupled to said dynamic condenser, an alternating current amplifier having a grid-to-cathode input circuit, an isolating coupling circuit connecting the output of dynamic condenser to the input of the amplifier consisting of a resistance-capacity coupler connected across the dynamic condenser having a junction point between the condenser and resistor thereof, a coupling condenser connected between said junction point and the input grid of the amplifier, and a resistor connected between the grid and cathode of the amplifier input circuit, a synchronous detector comprising a vacuum tube having at least two control electrodes and an output circuit, means for coupling the driving source means to one of the control electrodes of the synchronous detector, means for coupling the output of the amplifier to the other of said control electrodes, negative feedback means connecting the amplifier to the dynamic condenser, and means to measure the magnitude of the negative feedback.

HARRY PALEVSKY.
ROBERT K. SWANK.

REFERENCES CITED

The following references are of record in the file of this patent:

UNITED STATES PATENTS

| Number | Name | Date |
| --- | --- | --- |
| 2,236,985 | Bartelink | Apr. 1, 1941 |
| 2,284,476 | MacKay | May 26, 1942 |
| 2,297,543 | Eberhardt et al. | Sept. 29, 1942 |
| 2,309,560 | Welty | Jan. 26, 1943 |
| 2,376,392 | Shepherd | May 22, 1945 |
| 2,391,776 | Fredendall | Dec. 25, 1945 |
| 2,406,492 | Dorsman | Aug. 27, 1946 |
| 2,413,023 | Young | Dec. 24, 1946 |
| 2,459,730 | Williams Jr. | Jan. 18, 1949 |